(12) United States Patent
Muthukrishnan et al.

(10) Patent No.: US 9,069,509 B2
(45) Date of Patent: Jun. 30, 2015

(54) SYSTEM AND METHOD FOR PRINTING RELEVANT CONTENT VIA A CLOUD PRINT SERVICE

(71) Applicant: HEWLETT-PACKARD DEVELOPMENT COMPANY, L.P., Houston, TX (US)

(72) Inventors: Rajesh Muthukrishnan, Bangalore (IN); Bibhu Prasad Biswal, Bangalore (IN); Venugopal Kumarahalli Srinivasmurthy, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/847,498

(22) Filed: Mar. 20, 2013

(65) Prior Publication Data

US 2014/0285836 A1 Sep. 25, 2014

(51) Int. Cl.
*G06K 15/02* (2006.01)
*G06F 3/12* (2006.01)

(52) U.S. Cl.
CPC .................................... *G06F 3/1287* (2013.01)

(58) Field of Classification Search
USPC ............................ 358/1.14, 1.15, 468; 725/10
See application file for complete search history.

(56) References Cited

U.S. PATENT DOCUMENTS

| 6,967,566 | B2 | 11/2005 | Weston et al. | |
|---|---|---|---|---|
| 8,161,518 | B2 * | 4/2012 | Satoda | 725/135 |
| 8,570,572 | B2 * | 10/2013 | Shustef et al. | 358/1.15 |
| 2003/0084166 | A1 * | 5/2003 | Hosoi | 709/227 |
| 2009/0149246 | A1 * | 6/2009 | Opaluch | 463/29 |
| 2009/0150760 | A1 | 6/2009 | Winkler et al. | |
| 2009/0204488 | A1 | 8/2009 | Leviev-Cohen | |
| 2010/0138199 | A1 * | 6/2010 | Soto et al. | 703/2 |
| 2010/0325646 | A1 * | 12/2010 | Alhadeff et al. | 725/10 |
| 2012/0046859 | A1 * | 2/2012 | Imes et al. | 701/409 |
| 2012/0300249 | A1 * | 11/2012 | Shustef et al. | 358/1.15 |
| 2013/0144715 | A1 * | 6/2013 | Kranzley et al. | 705/14.49 |
| 2013/0163027 | A1 * | 6/2013 | Shustef | 358/1.14 |
| 2013/0235418 | A1 * | 9/2013 | Tanaka | 358/1.15 |
| 2014/0000964 | A1 * | 1/2014 | Selman et al. | 175/24 |
| 2014/0036296 | A1 * | 1/2014 | Armstrong | 358/1.14 |

FOREIGN PATENT DOCUMENTS

| JP | 2004-209046 | * | 7/2004 | A63F 13/12 |
|---|---|---|---|---|
| KR | 20010066727 | | 7/2001 | |
| KR | 20070055454 | | 5/2007 | |

OTHER PUBLICATIONS

Makvana Mahesh, "How to Use Google Cloud Print on Android", Feb. 28, 2012, http://android.appstorm.net/how-to/internet/how-to-use-google-cloud-print-on-android/.

* cited by examiner

*Primary Examiner* — Jerome Grant, II
(74) *Attorney, Agent, or Firm* — Mannava & Kang, P.C.

(57) ABSTRACT

A system and method for printing relevant content via a cloud print service upon completion of an entertainment event in media from an associated one of one or more entertainment devices are disclosed. In one example, the relevant content is obtained from an associated one of one or more entertainment device cloud services by the cloud print service upon completion of the entertainment event in the media. Further, the obtained relevant content is printed on a web connected printer by the cloud print service.

15 Claims, 3 Drawing Sheets

SYSTEM AND METHOD FOR PRINTING RELEVANT CONTENT VIA A CLOUD PRINT SERVICE

BACKGROUND

Generally, a cloud print service enables users to print a wide range of digital content available in the web directly from a web connected printer. A large amount of printable digital content is available through a media industry which the cloud print service can leverage. However, existing cloud print service techniques in the media industry do not enable the users to print relevant content. Also in the existing techniques, the web connected printer, being the only device capable of printing such content is not providing a direct solution to enable the users in the media industry to print the relevant content. Therefore, the users playing a favorite media for a first time in a certain level often end up searching for entertainment device control instructions, tips on how to improve media playing skills, coloring pages associated with the media, and a certificate for completing a level.

BRIEF DESCRIPTION OF THE DRAWINGS

Examples of the invention will now be described in detail with reference to the accompanying drawings, in which.

The drawings described herein are for illustration purposes only and are not intended to limit the scope of the present disclosure in any way.

DETAILED DESCRIPTION

A system and method for printing relevant content via a cloud print service are disclosed. In the following detailed description of the examples of the present subject matter, references are made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

Figure 1:
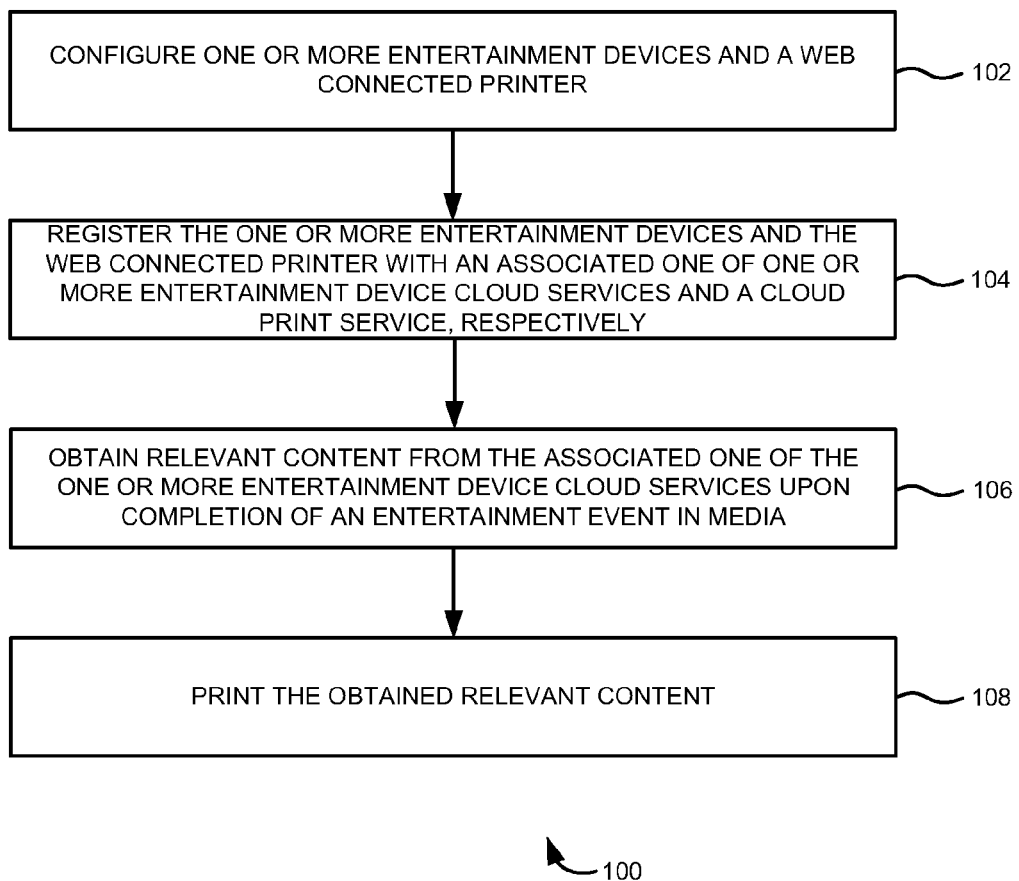
FIG. 1 illustrates a flow diagram of a method for printing relevant content via a cloud print service, according to an embodiment.

FIG. 1 illustrates a flow diagram 100 of a method for printing relevant content via a cloud print service, according to an embodiment. At block 102, one or more entertainment devices and a web connected printer are configured using a software development kit (SDK) by a user. At block 104, the one or more entertainment devices and the web connected printer are registered with an associated one of one or more entertainment device cloud services and the cloud print service, respectively, by the user. Further, options are provided, to the user, to define a number of pages to print, a level of content to print, filters for prints and the like in a web portal.

At block 106, the relevant content is obtained from the associated one of the one or more entertainment device cloud services by the cloud print service upon the completion of an entertainment event in media from an associated one of the one or more entertainment devices. For example, the media includes a game, an interactive online media and any other media. In one example, the entertainment device includes a gaming console and the like. For example, each entertainment device cloud service includes live content associated with the user of the entertainment device and media. Each entertainment device cloud service also includes user specific documents, such as photos and the like. Exemplary entertainment event includes a level, a stage, a goal and the like in the media. For example, the relevant content includes a certificate for the completion of the entertainment event, entertainment device control instructions, tips to improve media playing skills, coloring pages associated with the entertainment event and the like.

In one exemplary implementation, the completion of the entertainment event is identified, by the cloud print service, by checking the status of the media with the associated one of the one or more entertainment device could services. Further, the relevant content is obtained from the associated one of the one or more entertainment device cloud services by the cloud print service upon identifying the completion of the entertainment event. In some embodiments, the associated one of the one or more entertainment device cloud services sends the relevant content to the cloud print service. This is explained in more detailed with reference to FIGS. 2 and 3. In an exemplary embodiment, the user can access the relevant content through a print application on a web connected device, which lists the printable content available based on the current media being played by the user. At block 108, the obtained relevant content is printed on the web connected printer by the cloud print service. In some embodiments, the user specific documents stored in the associated one of the one or more entertainment device cloud services are printed on the web connected printer via the cloud print service.

Figure 2:
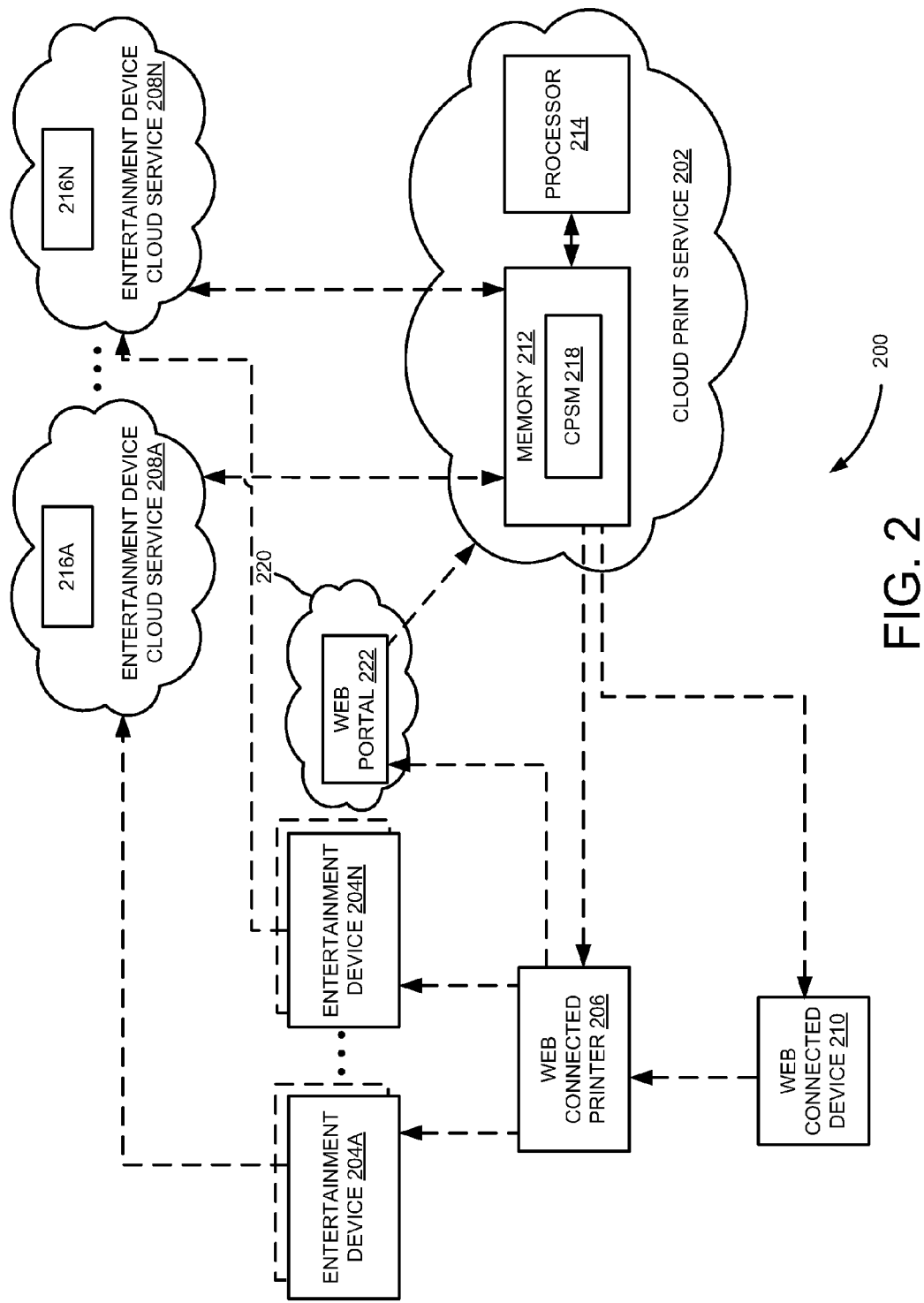
FIG. 2 illustrates a system for printing the relevant content, using the process described in FIG. 1, according to an embodiment.

Referring now to FIG. 2, which illustrates a system 200 for printing the relevant content, using the process described in FIG. 1, according to an embodiment. As shown in FIG. 2, the system 200 includes a cloud print service 202, one or more of entertainment devices 204A-N, a web connected printer 206, one or more entertainment device cloud services 208A-N, a web connected device 210 and a cloud service 220. For example, the entertainment devices 204A-N are entertainment devices of various types. Further, the entertainment device cloud services 208A-N include entertainment device databases 216A-N, respectively. Furthermore, the cloud print service 202 includes a processor 214. In addition, the cloud print service 202 includes a memory 212. In addition, the cloud service 220 includes a web portal 222. Moreover, the memory 212 includes a cloud print service module (CPSM) 218.

Also as shown in FIG. 2, the cloud print service 202 is communicatively coupled to the one or more entertainment device cloud services 208A-N. Further, the web connected printer 206 and the one or more entertainment devices 204A-N are configured using a SDK. Furthermore, the web connected printer 206 is registered with the cloud print service 202. Further, the CPSM 218 provides options, to the user, to define a number of pages to print, a level of content to print, filters for prints and the like in the web portal 222. In addition, the one or more entertainment devices 204A-N are registered with an associated one of the entertainment device cloud services 208A-N. Also, the memory 212 is coupled to the processor 214.

In operation, the CPSM 218 obtains relevant content from the associated one of the entertainment device cloud services 208A-N upon completion of an entertainment event in media the user is playing using the associated one of the entertainment devices 204A-N. For example, the media includes a game, an interactive online media and any other media. In this context, the CPSM 218 identifies the completion of the entertainment event by periodically checking a status of the media with the associated one of the entertainment device cloud services 208A-N. For example, the entertainment device databases 216A-N include live content associated with the user of each of the entertainment devices 204A-N and the media the user is playing. The entertainment device databases 216A-N also include user specific documents, such as photos and the like. For example, the entertainment event includes a level, a stage, a goal and the like in the media. Exemplary relevant content include a certificate for the completion of the entertainment event, entertainment device control instructions, tips to improve media playing skills, coloring pages associated with the entertainment event and the like.

Further in this context, the CPSM 218 obtains the relevant content from the associated one of the entertainment device databases 216A-N in the entertainment device cloud services 208A-N upon identifying the completion of the entertainment event. In one exemplary implementation, the entertainment device cloud services 208A-N sends a uniform resource locator (URL) associated with the relevant content to the CPSM 218 upon identifying the completion of the entertainment event and then the CPSM 218 obtains the relevant content using the URL. In some embodiments, the user also can access the content through a print application on the web connected device 210, which lists the printable content available based on the current media being played by the user.

Further in operation, the CPSM 218 prints the obtained relevant content on the web connected printer 206. In some embodiments, the entertainment device cloud services 208A-N prints the user specific documents stored in the associated one of the entertainment device databases 216A-N on the web connected printer 206 via the cloud print service 202. This is explained in more detail with reference to FIG. 3.

Figure 3:
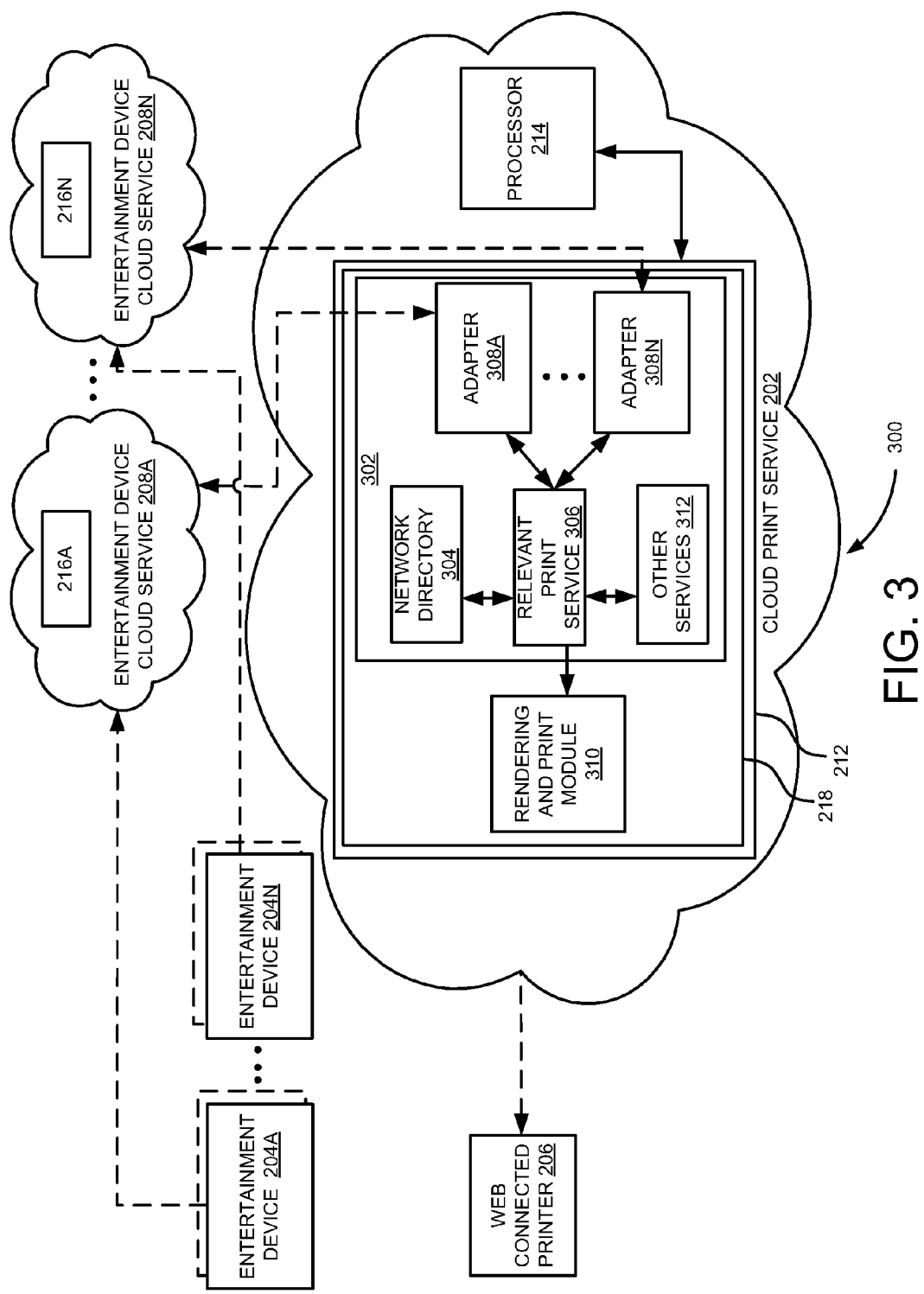
FIG. 3 illustrates a block diagram including major components of a cloud print service module (CPSM), shown in FIG. 2, according to an embodiment.

Referring now to FIG. 3, which illustrates a block diagram 300 including major components of the CPSM 218, shown in FIG. 2, according to an embodiment. As shown in FIG. 3, the block diagram 300 includes the cloud print service 202, the entertainment devices 204A-N, the entertainment device cloud services 208A-N, and the web connected printer 206. Further, the entertainment device cloud services 208A-N include the entertainment device databases 216A-N, respectively. Furthermore, the cloud print service 202 includes the processor 214 and the memory 212 including the CPSM 218. In addition, the CPSM 218 includes a cloud print service platform 302 and a rendering and printing module 310. Moreover, the cloud print service platform 302 includes a network directory 304, a relevant print service 306, one or more adapters 308A-N and other services 312.

Also as shown in FIG. 3, the cloud print service 202 is communicatively coupled to the entertainment device cloud services 208A-N. Particularly, each of the adapters 308A-N is communicatively coupled to the associated one of the entertainment device cloud services 208A-N. Further, the web connected printer 206 and the one or more entertainment devices 204A-N are configured using the SDK. Furthermore, the web connected printer 206 is registered with the cloud print service 202. In addition, the CPSM 218 provides the options, to the user, to define the number of pages to print, the level of content to print, the filters for prints and the like in the web portal 222. In addition, the one or more entertainment devices 204A-N are registered with the associated one of the entertainment device cloud services 208A-N. Also, the memory 212 is coupled to the processor 214. Further, the relevant print service 306 is communicatively coupled to the rendering and printing module 310, network directory 304, and adapters 308A-N.

For example, the network directory 304 is a directory of credential and permission for all networks for a particular user. The network directory 304 is maintained in the cloud print service platform 302 in a secure way, whenever the user registers the web connected printer 206 and opt for relevant printing through the networks. Further, the network directory 304 stores identities (IDs) of the entertainment devices 204A-N.

In operation, the relevant print service 306 obtains the relevant content from the associated one of the one or more entertainment device cloud services 208A-N upon completion of the entertainment event in the media the user is playing using the associated one of the entertainment devices 204A-N. In this context, the relevant print service 306 identifies the completion of the entertainment event by periodically checking the status of the media with the associated one of the entertainment device cloud services 208A-N via the associated one of the adapters 308A-N. For example, the entertainment device databases 216A-N include live content associated with the users of the entertainment devices 204A-N and the media the users are playing. The entertainment device databases 216A-N also include user specific documents, such as photos and the like. Further in this context, the relevant print service 306 receives a notification indicating completion of the entertainment event via the associated one of the adapters 308A-N. In one exemplary implementation, the associated one of the entertainment device cloud services 208A-N sends a notification indicating completion of the entertainment event to the relevant print service 306 via the associated one of the adapters 308A-N.

Furthermore, the relevant print service 306 parse the notification for information associated with the media and network ID and obtains associated entertainment device ID from the network directory 304. Using this information, the relevant print service 306 then obtains the relevant content from the associated one of the entertainment device databases 216A-N in the entertainment device cloud services 208A-N via the associated one of the adapters 308A-N. For example, the adapters 308A-N connects the relevant print service 306 to the associated one of the entertainment device cloud services 208A-N via application programming interfaces (APIs). For example, the APIs verifies a tag of the logged in user and gets their friend list, as well as their status and card. After getting the details, it fetches the relevant content and pushes to the web connected printer 206. In some embodiments, the entertainment device cloud services 208A-N sends the relevant content to the relevant print service 306 upon completion of the entertainment event. In addition, the relevant print service 306 prints the relevant content on the web connected printer 206 via the rendering and printing module 310. In some embodiments, the entertainment device cloud services 208A-N prints the user specific documents stored in the associated entertainment device databases 216A-N on the web connected printer 206 via the cloud print service 202.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a computer system and may be performed in any order (e.g., including using means for achieving the various operations). Accordingly, the specification and drawings are to be regarded in an illustrative rather than a restrictive sense.

In various examples, system and method described in FIGS. 1 through 3 propose a technique to print relevant content via the cloud print service. The proposed technique enables the cloud print service to print relevant and live content from the entertainment device cloud service which has a huge user base. The proposed technique also enables users to print the relevant content with minimal intervention. Further, mobile devices with a print application can display content available so that the user can choose the relevant content to print. Also, the above technique enables the users to configure print settings through the web portal.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method, comprising:
   checking, by a processor of a cloud print service, a status of media delivered from an entertainment device cloud service to an entertainment device;
   obtaining relevant content from the entertainment device cloud service by the processor of the cloud print service upon completion of an entertainment event in the media delivered to the entertainment device from the entertainment device cloud service, wherein the relevant content is relevant to the delivered media; and
   instructing, by the processor of the cloud print service, a web connected printer to print the obtained relevant content.

2. The method of claim 1, further comprising:
   instructing, by the processor of the cloud print service, the web connected printer to print one or more user specific documents stored in the entertainment device cloud service.

3. The method of claim 1:
   wherein the entertainment device and the web connected printer are registered with the entertainment device cloud service and the cloud print service, respectively.

4. The method of claim 3, further comprising:
   providing, by the processor of the cloud print service, options to define at least one of a number of pages to print, a level of content to print, and filters for prints in a web portal.

5. The method of claim 1, wherein obtaining the relevant content from the entertainment device cloud service by the processor of the cloud print service upon the completion of the entertainment event in the media further comprises:
   identifying, by the processor of the cloud print service, the completion of the entertainment event by periodically checking the status of the media delivered from the entertainment device cloud service; and
   obtaining the relevant content from the entertainment device cloud service upon identifying the completion of the entertainment event.

6. The method of claim 1, wherein the entertainment event comprises at least one of a level, a stage, and a goal in the media and wherein the relevant content comprises at least one of a certificate for the completion of the entertainment event, entertainment device control instructions, tips to improve media playing skills, and coloring pages associated with the entertainment event.

7. A cloud print service apparatus comprising:
   a memory storing a cloud print service module (CPSM); and
   a processor connected to the memory to execute the CPSM, wherein execution of the CPSM causes the processor to:
   check a status of media delivered from an entertainment device cloud service to an entertainment device;
   obtain relevant content from the entertainment device cloud service upon completion of the entertainment event in the media delivered to the entertainment device from the entertainment device cloud service, wherein the relevant content is relevant to the delivered media; and
   instruct a web connected printer to print the obtained relevant content.

8. The apparatus of claim 7, wherein the processor is further to instruct the web connected printer to print one or more user specific documents stored in the entertainment device cloud services.

9. The apparatus of claim 7, wherein the processor is further to identify the completion of the entertainment event by periodically checking the status of the media delivered from the entertainment device cloud service and obtain the relevant content from the entertainment device cloud service upon identifying the completion of the entertainment event.

10. The apparatus of claim 7, wherein the entertainment event comprises at least one of a level, a stage or a goal in the media and wherein the relevant content comprise a certificate for the completion of the entertainment event, entertainment device control instructions, tips to improve media playing skills, and coloring pages associated with the entertainment event.

11. A non-transitory computer-readable storage medium having instructions that, when executed by a computing device, cause the computing device to:
   check a status of media delivered from an entertainment device cloud service to an entertainment device;
   determine that an entertainment event in the media has completed;
   obtain relevant content from the entertainment device cloud services in response to the determination that the entertainment event in the media delivered to the entertainment device from the entertainment device cloud service has been completed, wherein the relevant content is relevant to the delivered media; and
   instruct a printer to print the obtained relevant content.

12. The non-transitory computer-readable storage medium of claim 11, wherein the instructions further cause the computing device to:
   instruct the printer to print one or more user specific documents stored in the entertainment device cloud services.

13. The non-transitory computer-readable storage medium of claim 11, wherein the printer comprises a web connected printer and wherein the entertainment device and the web connected printer are registered with the entertainment device cloud service and a cloud print service, respectively.

14. The non-transitory computer-readable storage medium of claim 13, wherein the instructions further cause the computing device to:
provide options to define at least one of a number of pages to print, a level of content to print, and filters for prints in a web portal.

15. The non-transitory computer-readable storage medium of claim 11, wherein the entertainment event comprises at least one of a level, a stage or a goal in the media and wherein the relevant content comprise a certificate for the completion of the entertainment event, entertainment device control instructions, tips to improve media playing skills, and coloring pages associated with the entertainment event.

* * * * *

UNITED STATES PATENT AND TRADEMARK OFFICE
CERTIFICATE OF CORRECTION

PATENT NO. : 9,069,509 B2  
APPLICATION NO. : 13/847498  
DATED : June 30, 2015  
INVENTOR(S) : Rajesh Muthukrishnan et al.

Page 1 of 1

It is certified that error appears in the above-identified patent and that said Letters Patent is hereby corrected as shown below:

In the claims,

In column 5, line 51, in Claim 3, delete "1:" and insert -- 1, --, therefor.

Signed and Sealed this  
Twelfth Day of January, 2016

Michelle K. Lee  
*Director of the United States Patent and Trademark Office*